May 5, 1925.

J. BOLICK 1,536,417

WHEEL SPOKE.

Filed Sept. 17, 1923

Jerome Bolick
Inventor,

By C. A. Snow & Co.

Attorneys.

Patented May 5, 1925.

1,536,417

UNITED STATES PATENT OFFICE.

JEROME BOLICK, OF CONOVER, NORTH CAROLINA.

WHEEL SPOKE.

Application filed September 17, 1923. Serial No. 663,211.

*To all whom it may concern:*

Be it known that I, JEROME BOLICK, a citizen of the United States, residing at Conover, in the county of Catawba and State of North Carolina, have invented a new and useful Wheel Spoke, of which the following is a specification.

This invention relates to wheel construction and has for its object the provision of novel spoke construction whereby the rim and hub of a wheel may be securely connected by means of the spokes, yet permit a limited amount of relative movement between the rim and hub without impairing the strength of the wheel.

Another object is the provision of a novel form of resilient spoke construction.

With these and other objects in view, which will appear as the description proceeds, the invention resides in the combination and arrangement of parts and in the details of construction hereinafter described and claimed, it being understood that slight changes may be made in the structure within the scope of what is claimed without departing from the spirit of the invention or sacrificing any of the advantages thereof.

Referring to the drawings:

Figure 1 is a view in elevation of a portion of a wheel constructed in accordance with the invention; Figure 2 is a sectional view taken on line 2—2 of Figure 1; and Figure 3 is a sectional view taken on line 3—3 of Figure 1.

Referring to the drawings by characters of reference the numeral 10 designates a portion of hub construction illustrated and described in my co-pending application Serial No. 560,645 filed May 13, 1922.

The portion 11 of the hub 10 is provided with sockets 12 including an outer portion 13 having tapered side walls and an inner portion 14 having parallel side walls, the diameter of the inner portion being the same as the diameter of the tapered portion at its least diametrical dimension.

It is to be understood that the spoke construction herein disclosed may be used with any form of rim, in the present instance it having been shown as applied to a demountable rim structure which includes a felloe 15 having a depending flange 16. Clips 17 are secured to the flange 16 by means of bolts 18 and clamp the rim 19 to the felloe 15.

Socket members 20 are secured by means of rivets 21 or the like to the felloe 15. The said members are each provided with a socket 22 which is similar to the socket 12, having a tapered portion 23 and a cylindrical portion 24.

Connecting the rim portion 15 and the hub 10 are spokes 25, each comprising end portions 26 shaped to fit the sockets 12 and 22 and an intermediate portion 27, the intermediate portion being formed to lend resiliency to the wheel. The part 27 is flattened and extended throughout the greater portion of the length of the spoke and merges into the tapered portion at the ends thereof.

The spokes are located in the wheel with the greatest dimension of the flattened portion arranged transversely of the wheel so that lateral strains are provided against, the thin portion of the spoke permitting a limited amount of flexure in a direction at right angles to the axis of the wheel, thus rendering the wheel resilient. In providing the sockets with a straight bored portion and the ends of the spokes with a portion to fit the same, any tendency of the spokes to become loose, due to elongation of the distance between the rim and hub at the top of the wheel as the same rotates under a load will be prevented by the straight bored portion. This straight portion of the spoke permits limited longitudinal movement without becoming loose as is the case with the tapered portion at the top of the wheel. At the bottom of the wheel the tapered portion of the spoke supports the load.

Having thus described the invention, what is claimed is:

A wheel spoke comprising an intermediate flattened portion, cylindrical end portions and a tapered portion connecting the flattened portion with each cylindrical portion.

In testimony that I claim the foregoing as my own, I have hereto affixed my signature in the presence of two witnesses.

JEROME BOLICK.

Witnesses:
I. E. SIMPSON,
AGNES ROCKELLI.